United States Patent [19]

Sheffer

[11] Patent Number: 5,884,184
[45] Date of Patent: Mar. 16, 1999

[54] SUPERVISED CELLULAR REPORTING NETWORK

[76] Inventor: Eliezer Arie Sheffer, 750 State Str. #415, San Diego, Calif. 92101

[21] Appl. No.: 641,520

[22] Filed: May 1, 1996

[51] Int. Cl.$^6$ .............................. H04B 7/00; H04Q 7/20; H04M 11/04; G05B 23/02
[52] U.S. Cl. .................. 455/521; 455/455; 455/404; 379/39; 379/45; 340/825.06
[58] Field of Search ................................. 455/404, 521, 455/403, 507, 455, 450, 451, 452; 379/39, 37, 40, 42–47, 49, 50; 340/506, 507, 517–521, 526–529, 534, 511, 508, 522, 825.31, 825.32, 825.36, 825.44

[56] References Cited

U.S. PATENT DOCUMENTS

| | | | |
|---|---|---|---|
| 4,446,458 | 5/1984 | Cook | 340/825.06 |
| 4,868,859 | 9/1989 | Sheffer | 379/39 |
| 4,993,059 | 2/1991 | Smith et al. | 379/39 |
| 5,027,383 | 6/1991 | Sheffer | 379/39 |
| 5,125,021 | 6/1992 | Lebowitz | 379/40 |
| 5,134,644 | 7/1992 | Garton et al. | 455/404 |
| 5,517,547 | 5/1996 | Ladha et al. | 455/404 |
| 5,745,849 | 4/1998 | Britton | 455/404 |

Primary Examiner—Dwayne D. Bost
Assistant Examiner—Tracy M. Legree
Attorney, Agent, or Firm—Presseisen & Ridelbach, PLC.; Charles F. Reidelbach, Jr.

[57] ABSTRACT

The present invention provides an independent supervised communications network which interfaces with an existing cellular telecommunications network by utilizing locally unused cellular frequencies to report information from a premise to a central monitoring facility. This invention utilizes an input device associated with the premise for providing one or more status messages to a transceiver module. The transceiver module may be a modified cellular telephone which is operable in one of three modes; supervision, event and wait. The cellular phone modifications are primarily software changes which provide a logic routine for scanning and selecting an available forward control channel based on a comparison of preselected criteria with measured characteristics and determining a reverse control channel corresponding to the selected forward control channel. The transceiver module transmits the message to the message processor over a predetermined duration, either periodically if the message is a supervision message or continuously if the message is an event message. The message processor, placed at a site proximate to a predetermined cellular site, receives and decodes the messages transmitted from the transceiver module and transmits the messages to a central monitoring facility.

5 Claims, 4 Drawing Sheets

SUPERVISED CELLULAR REPORTING NETWORK

FIELD OF THE INVENTION

The present invention pertains generally to wireless communications systems for reporting information from one or more premises to a central monitoring facility. More specifically, the present invention provides a supervised wireless reporting system which utilizes cellular telecommunications frequencies to communicate messages over an independent communications network.

BACKGROUND OF THE INVENTION

A wide variety of reporting systems have been developed for providing communication between a premise and a central monitoring facility. In the past, these reporting systems have been typically limited to commercial and residential security alarm systems, medical emergency systems, and environmental equipment monitoring systems. However, with the increasing development of wireless communications technology, the use and applications of reporting systems is expected to grow to encompass fleet management, remote utility metering, vending machine status, and many other commercial markets.

The key to the effectiveness and integrity of the reporting system provided often depends upon the means which are used to establish communications between the reporting unit provided at the premises and the monitoring equipment provided at the central monitoring facility. It has become well known in the industry that repetitive monitoring of the link between the premise and central monitoring facility provides an enhancement in reliability. These systems which implement a periodic monitoring of the communication link are commonly known as "supervised" reporting devices.

Aside from increased reliability in the communication link, there are several notable reasons why the use of a "supervised" system is desirable over the less sophisticated "unsupervised" systems. With respect to the use of the reporting system as a security alarm device, insurance companies often determine insurance rates based on the quality of electronic and/or automatic monitoring of the communication link between their commercial establishment or residence and a central monitoring facility. In fact, Underwriters Laboratories has established several grade levels which attach to the type and extent of monitoring provided. The highest grade or grade AA is attached to a supervised link which is monitored by a central monitoring station no later than 6 minutes after compromise in the link.

One supervised system for providing communications between the premises and the central monitoring facility is by means of direct wired telephone lines which connect the premise to the central monitoring facility. The drawbacks of such a system is the high installation expense and high usage fees as well as low availability. Another supervised system uses a switched telephone network commonly known as a derived channel system. Although the use of a derived channel system can be shared by more users, it forces telephone companies to add expensive equipment which does not provide an attractive return. The result is that these systems are not widely available and are limited to commercial areas where higher profitability on alarm systems can be expected.

Another supervised system involves the replacement of wired lines with wireless communications such as two-way radios. Radio systems are reliable because there is less of a likelihood of outside interference such as line tampering. Although in some respects more reliable than a wired system, two-way radio systems are subject to significant limitations in view of the regulatory constraints which are in place regarding the use of radio waves, and in terms of the number of frequencies which are available for use in a particular system, limiting the number of subscribers. In addition, the significant cost of installation and maintenance with the frequent use of such a system is often prohibitive for supervisory purposes. Consequently, their application is almost exclusively limited to non-supervised systems.

In U.S. Pat. No. 4,868,859 (hereinafter '859), issuing to Sheffer, lines 47–50, it was suggested that two-way radio communications be accomplished by means of the cellular telephone network. At first glance, this appears attractive because it incorporates an existing cellular communication infrastructure. The disclosure in Sheffer '859 suggests combining a supervised derived channel system with a non-supervised cellular telephone system to provide a more reliable redundant system. Specifically, Sheffer '859 teaches the use of a non-supervised cellular telephone due to the prohibitive expense as a; supervised system resulting from charges associated with the cellular telephone network. For example, each time the central monitoring facility monitors the link, a supervised call must be made over the cellular telephone network resulting in significant telephone charges. As is clearly evident from the above example, the cost of such a supervised wireless system is prohibitive to the average consumer.

It is therefore the primary object of the present invention to provide a highly reliable reporting system which is not cost prohibitive to the average consumer as are the previously available systems.

It is also an object of the present invention to provide a reporting system which utilizes a communications infrastructure which is universally accessible and widely available.

It is also an object of the present invention to provide a supervised wireless reporting system which is capable of providing a high degree of reliability without suffering from the significant drawbacks of the previously available wireless systems.

It also an object of the present invention to enable a central monitoring facility to provide a communicated message verification utilizing the same premise equipment yet through a separate wireless communications network.

It is also an object of the present invention to provide a reporting system which provides redundant equipment utilization in the event of localized equipment failure.

It is also an object of the present invention to provide a reporting system which is not limited in terms of the number of subscribers which may be connected to the system, as a result of technical or regulatory constraints.

It is also an object of the present invention to provide a reporting system which is capable of being adapted to and/or added to existing reporting systems, to the extent possible.

It is also an object of the present invention to provide a reporting system having the foregoing capabilities, yet which is inexpensive and easy to install, maintain and service.

These and other objects are achieved in accordance with the present invention by providing a supervised communications network which utilizes existing cellular telecommunications network frequencies to report information from a premise to a central monitoring facility. The present invention provides an input device for providing one or more messages by means of a digital signal to a transceiver module. The messages received by the transceiver module may be either a supervision message or event message. In one embodiment, the input device is an alarm system which provides a digital signal corresponding to a status of the alarm system.

The transceiver module associated with the premise may be a modified cellular telephone which is operable in one of the three following modes; supervision, event and wait. The transceiver module transmits the supervision or event messages on a preselected reverse control channel. The method of preselection is intended to select a reverse control channel which is inactive or not used by any proximately located cell site. The reverse control channel selected has a corresponding forward control channel which preferably has a signal strength below the range of −115 to −125 dBm and preferably is adjacent in frequency to a forward control channel having a signal strength below a range of −75 to −85 dBm. The selection of an inactive reverse control channel precipitates the above mentioned low signal strength forward control channel.

A message processor, placed at a site proximate to a predetermined cellular site, receives and decodes the messages transmitted from the transceiver module and transmits the messages to a central monitoring facility. The message processor may include one or more reverse control channel scanners for detecting an active reverse control channel. One or more reverse control channel receivers, operable with the reverse control channel scanners, receive and decode the messages detected by the reverse control channel scanners. A master module, operable with the reverse control channel scanners and the reverse control channel receivers, arranges and transmits the messages received by the message processor to the central facility by means of a standard modem.

It is anticipated that the present invention may be utilized in a network environment which may include multiple transceiver modules respectively located at multiple premises, and a message processor which receives and decodes multiple messages from respective multiple transceiver modules and transmits multiple messages to a central monitoring facility. In a similar manner, it is anticipated that there will be multiple message processors within the network 10.

A connection is provided between the transceiver module and a transducer such as microphone-speaker headset. While in supervision mode, the transceiver module repeatedly transmits supervision messages within a first preselected time interval. The preselected time interval is preferably between one and six minutes. While in an event mode, the transceiver module continuously transmits an event message for a second preselected time interval. Once the preselected time interval of the event message expires, the transceiver module enters the wait mode. While in wait mode, the transceiver module is connected to the headset and operates as a standard cellular telephone.

The present invention also pertains to a method of communicating information from a premise to a central facility using cellular telecommunications frequencies. The initial step in the method includes interfacing a transceiver module, associated with a premise, to an input device. The step is followed by the step of scanning multiple forward control channels using the transceiver module and determining a set of preselected criteria or characteristics such as the forward control channel number and a number indicative of a signal strength of the forward control number. The method continues with the step of storing the set of preselected criteria of one or more control channels in a data array and updating the predetermined criteria every predetermined interval. A predetermined interval may be the time it takes to scan of twenty one (21) forward control channels. The next step includes the step of selecting a forward control channel based on a comparison of the stored preselected criteria or characteristics and determining a reverse control channel corresponding to the selected forward control channel for transmission of the supervision or event message to the central facility. This step is followed by transmitting the message to a message processor either periodically every predetermined duration if the message is a supervision message, or continuously for a predetermined duration if the message is an event message. The method includes the step of transmitting the message received by the message processor to a central facility by forming a data package consistent with a standard reverse control channel message.

The step of selecting the forward control channel includes the steps of initially selecting multiple forward control channels having a signal strength remaining below a preselected threshold, eliminating those forward control channels initially selected if they are adjacent in frequency to a forward control channel which has a signal strength of a preselected value or higher, and randomly selecting one of remaining multiple forward control channels.

Further detail regarding the construction of a reporting system in accordance with the present invention may be had with reference to the detailed description which is provided below, taken in conjunction with the following illustrations.

DETAILED DESCRIPTION OF THE PREFERRED EMBODIMENT

Figure 1:
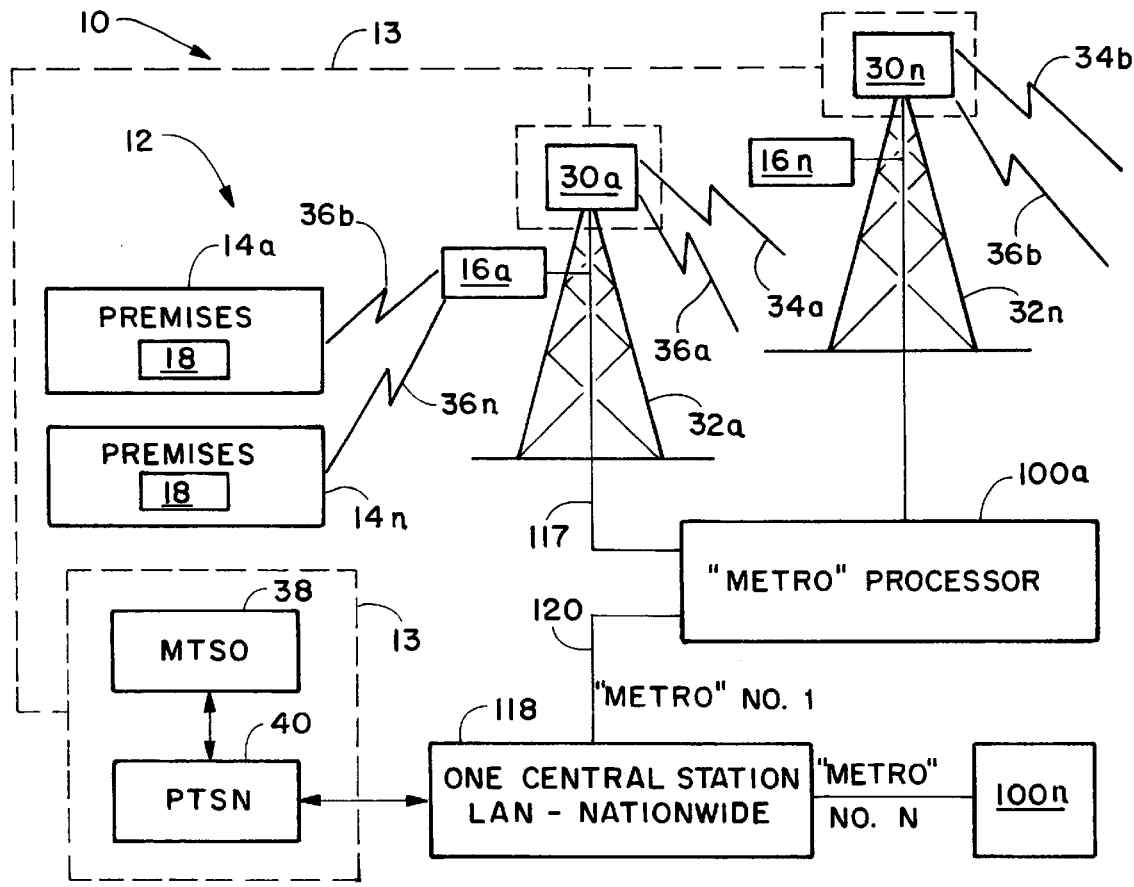
FIG. 1 is a block diagram of the reporting system of the present invention.

Initially referring to FIG. 1, an independent communications network 10 of the present invention is illustrated. The network 10 is added to the existing American Mobile Phone System (hereinafter AMPS) cellular telecommunications network 13 by utilizing pre-assigned cellular frequencies 12 for reporting information from a premise 14 to a message processor 16. The numerical designation of both premise 14 and message processor 16 in the text of this disclosure is properly referred in the drawings as premises 14a–14n and message processors 16a–16n, respectively. The premise 14 may be any mobile device, like a vehicle, or stationary residential or business building or any similar structure or enclosure. The premise 14 has associated premise equipment 18.

Figure 2:
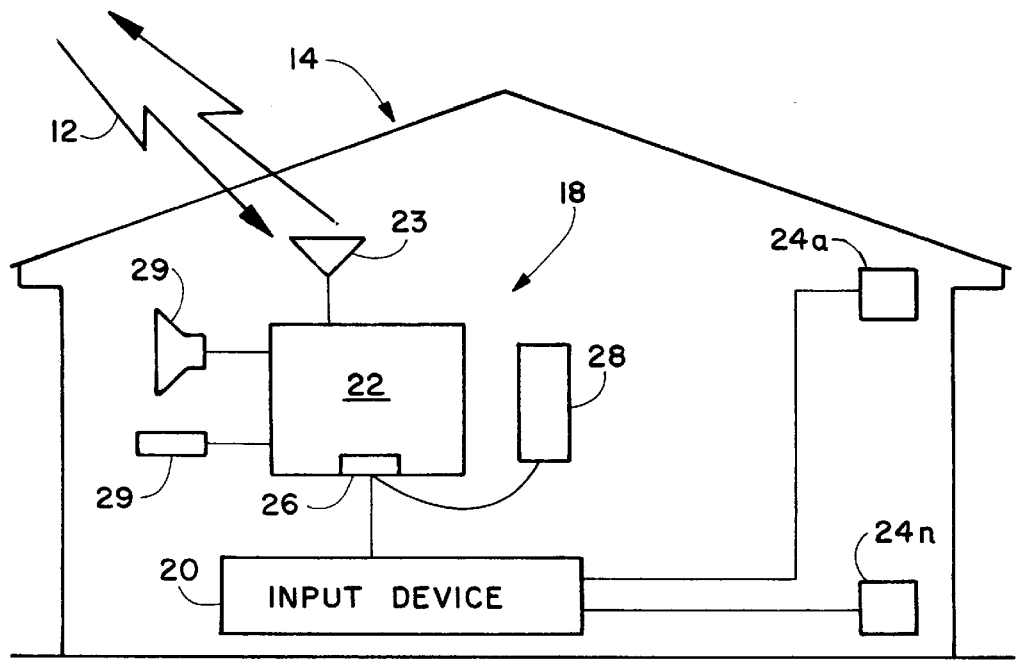
FIG. 2 is a block diagram of the implementation of the premise equipment in one application as an alarm system.

The premise equipment 18 is best illustrated by referring to FIG. 2. The premise equipment 18 typically includes two main components; an input device 20 for providing one or more messages and a transceiver module 22 for receiving the message from the input device 20 and further transmitting the message to the message processor 16 over antenna 23.

The input device 20 can be selected from a wide variety of devices, such as an alarm reporting device, a utility meter reporting device, a medical emergency reporting device, or any other known or foreseeable device for reporting a message or digital signal associated with the premise 14 or the occupants within the premise 14.

For illustrative purposes only, the input device 20 will be described as an alarm reporting device. The input device 20 may be connected to one or more sensors 24a–n which are capable of providing various signals to the input device 20. Any of a variety of different types of sensors 24 may be used in connection with such a system, including smoke detectors, fire detectors, various detectors for determining intrusions such as contact switches, light sensitive circuits and ultrasonic circuits, as well as any of a number of parameter sensors such as temperature sensors, pressure sensors, timing devices or the like. To be noted in this regard is that only one single sensor may be provided, or any number of plural sensors may be utilized in operative combination. In any event, such sensors 24 would be operatively connected to the input device 20 for ultimate processing of the signals by input device 20.

The input device 20 is configured to communicate with the transceiver module 22 to provide the transceiver module 22 with the status of the input device 20. The input device 20 may be any conventional control panel known in the art for providing one or more signals or messages associated with the premise 14 or its occupants. For instance, the control panel may be an already installed and existing alarm control panel. However, it is to be understood, that the present invention contemplates a wide variety of input devices 20.

The transceiver module 22 is preferably a well known AMPS cellular phone which utilizes an internal microprocessor as well as a handset connector 26 and handset 28. Faculties exist within the transceiver module 22 for the external connection of a transducer device 29. The transducer device 29 may be a microphone, speaker, or any combination thereof.

In the present invention, the transceiver module 22, or modified cellular phone, is connectable or interfacable with the input device 20 through the transceiver handset connector 26. It is well known that cellular phones have a handset connector 26. If a handset connector 26 is not available, any other similar means well known in the art could be implemented to interface the input device 20 to transceiver module 22. It should also be understood that additional well known electronic equipment such as switching devices may be necessary depending of the input device used.

From a software standpoint, the AMPS cellular phone is configured or modified to operate in two major modes. This is accomplished by altering the memory chip inside the AMPS cellular phone by any means well known in the art. The first mode is a set-up mode which allows the installer to utilize a handset 28 to initialize and update certain programmable phone parameters. In the set-up mode the cellular phone operates much like a commercially available cellular phone. Specifically, the set-up mode allows an operator to select or program the following: set-up mode or operational mode, supervised or non-supervised mode, new/modified central station telephone numbers, man-machine interface (MMI) parameters. When the handset 28 is connected to the transceiver module 22, the cellular phone remains operational in accordance with the EIA/TIA-553 standard. Electronic Industries Association EIA/TIA Standard, titled Mobile Station-Land Station Compatibility Specification, dated September 1989.

The second major mode is an operational mode. The operational mode provides the following sub-modes: supervision, event and wait submodes (hereinafter modes). During the supervision and event modes, the input device 20 is connected to the handset connector 26 in lieu of handset 28. When in the wait mode, the transceiver module 22 is enabled to receive incoming calls using the externally connected transducer device 29, such as a speaker-mike combination, for voice communications between premise 14 and central station or central monitoring facility.

In the preferred embodiment, four pins in the handset connector 26 provide the means by which digital information or messages are conveyed from the input device 20 to the transceiver module 22. Although not necessary for operability, the above mentioned four pins are typically unused when the handset connector 26 is connected to handset 28. This use of four pins would allow for 16 different types of messages to be conveyed regarding the status of input device 20. It should be mentioned here that the present invention is not limited to four pins for conveying the messages, but rather number of pins may be more or less depending on the particular application.

The transfer of the connection between the input device 20 and the transceiver module 22 can be accomplished by any well known means such as a switch or relay. This physical connection between the input device 20 and the transceiver module 22 may be the only hardware change required to utilize the standard cellular phone as the transceiver module 22 in network 10. However, the transceiver module 22 has significant software modifications as it automatically operates according to a software routine which incorporates a logical flow as described in greater detail below.

Referring again to FIG. 1, it was stated above that system 10 utilizes pre-assigned cellular frequencies 12 of the AMPS cellular telecommunications network 13 for reporting information from a premise 14 to a message processor 16. It is well known in the art that a significant component of the cellular telecommunications network 13 are multiple cellular sites 30a–n positioned on respective multiple structures 32a–n at strategic locations nationwide. Each cellular site 30a–n is assigned one of multiple licensed forward control channels 34a–n. As is well known in the industry, each forward control channel 34a–n is assigned a corresponding reverse control channel 36a–n.

The cellular site 30 continuously transmits information over its assigned forward control channel 34 to all cellular phones in its user defined area, and receives information over the corresponding reverse control channel 36 from cellular phones in the same defined area. The cellular telecommunications network 13 is currently licensed to use a total of twenty-one (21) forward control channels 34 and twenty-one (21) corresponding reverse control channels 36. Since there are multiple usable pairs of control channels at any one point in time with only one pair being used at any one particular cellular site 30, there are certain usable pairs of forward and reverse control channels 34,36 which remain inactive within any defined geographical area. It is the intent of the present invention to determine what these inactive pairs of control channels are and utilize them to communicate from a premise 14 to a message processor 16.

In the cellular telecommunications network 13, the cellular sites 30a–n are operable with the mobile telecommunications switching office 38 which is, in turn, operable with the public telephone switching network 40. Central to this invention is the fact that the present invention utilizes a separate and independent cellular telecommunications network 13 to communicate voice information for message verification between the central monitoring facility and premise 14, yet utilizes available or inactive forward control channels 34a–n and reverse control channels 36a–n to communicate date information from the transceiver module 22 to the message processor 16.

The key to the present invention is determining and selecting available licensed reverse and forward control channels 34, 36 without interfering with the normal operation of the cellular telecommunications network 13. This is accomplished through the programming of the cellular phone to perform certain logical steps or routines through a software program.

Figure 3A:
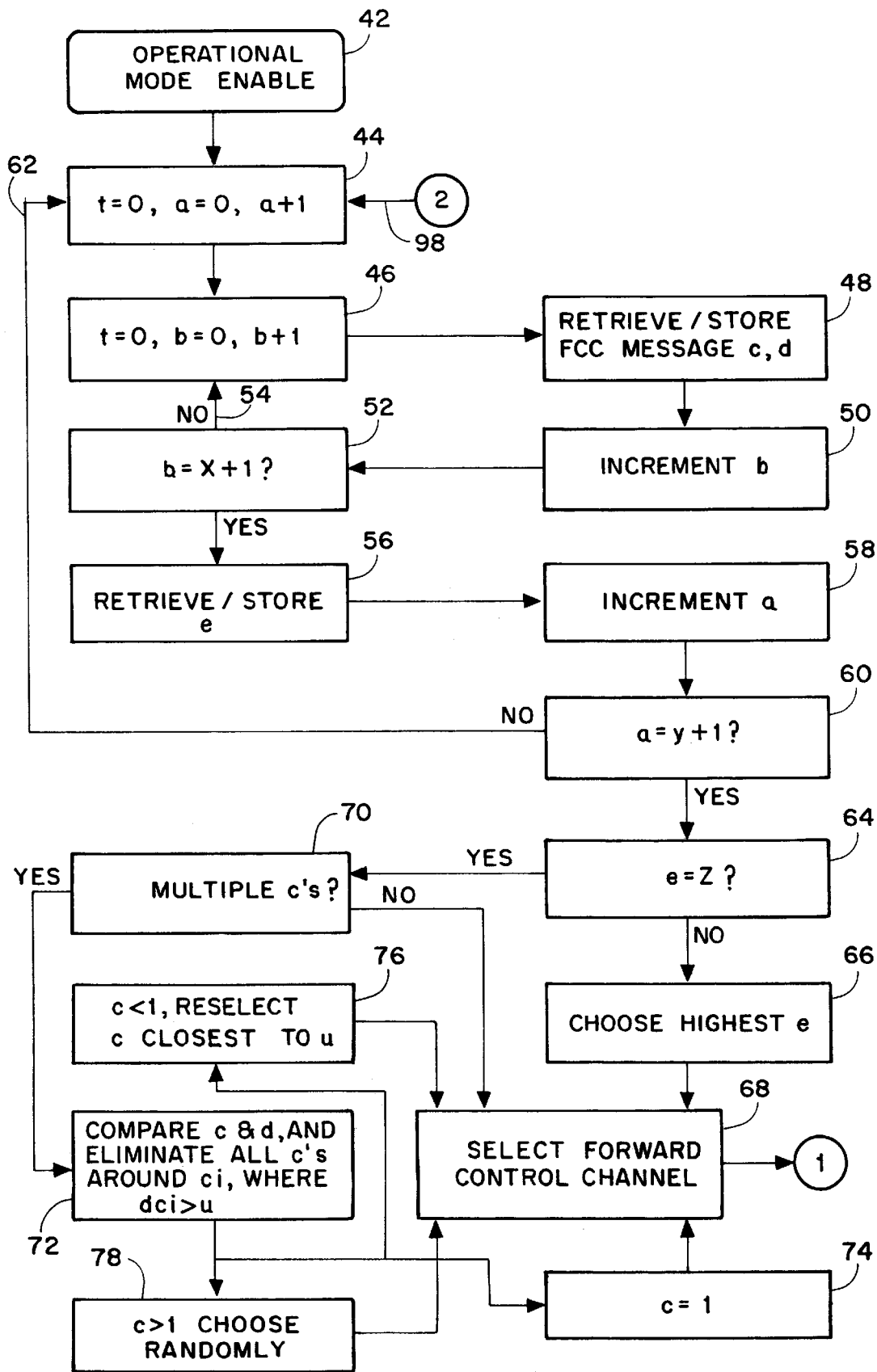
FIGS 3a and 3b are a logic flow diagram illustrating the steps taken by the premise equipment in communicating with the message processor.
Figure 3B:
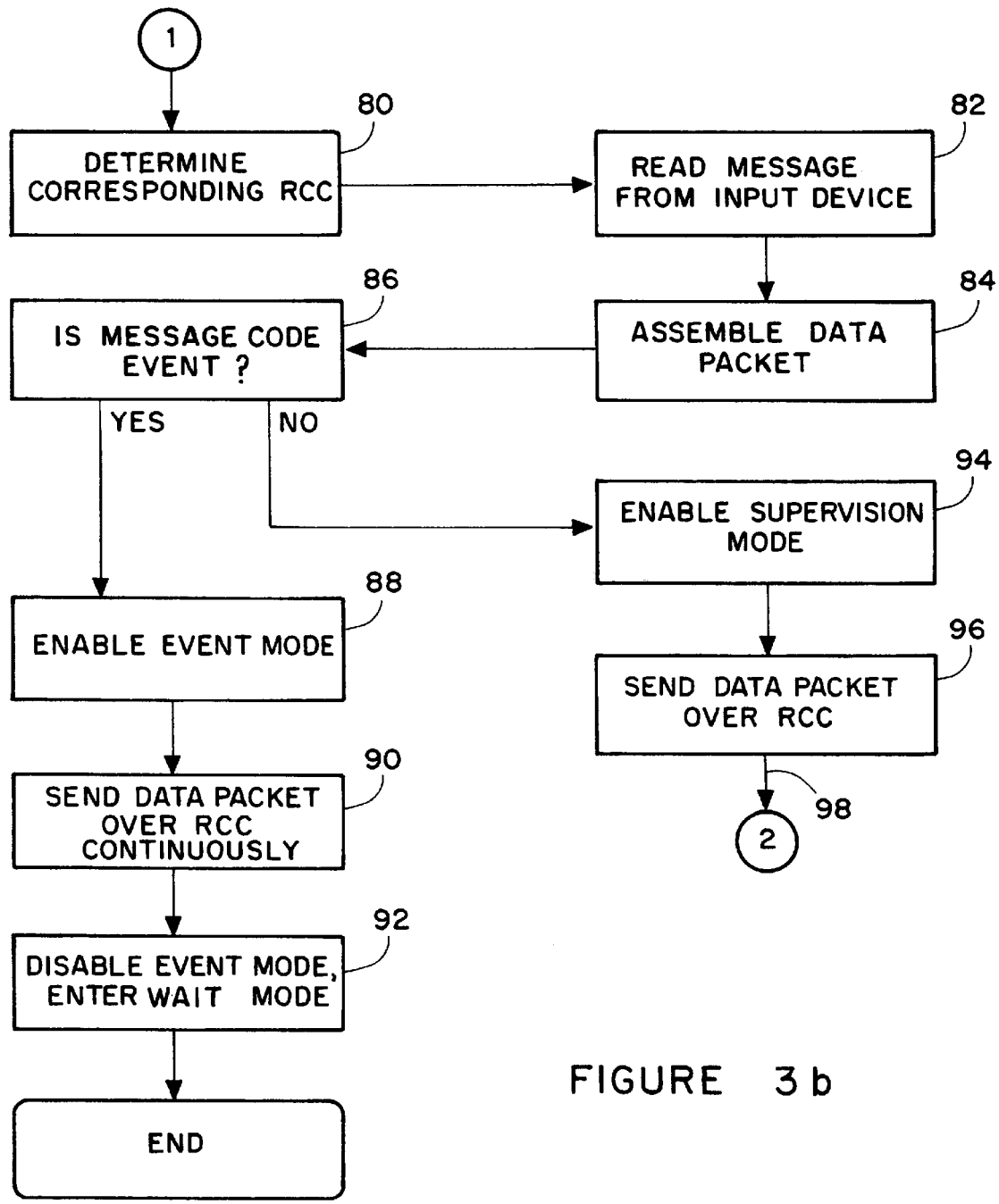

The steps or routines in the logical flow of the software program of the present invention are best illustrated by reviewing FIGS. 3a and 3b. The following are a number of variables which will be used throughout the discussion below.

a=number of scans of forward control channel spectrum
b=forward control channel count
c=forward control channel number
ci=selected forward control channels
d=first signal strength of forward control channel (RSSI)
e=sequentially uninterrupted times a forward control channel remained below a preselected threshold
f=programmed signal strength threshold
x=programmed number of forward control channels
y=programmed number of complete scans
z=programmed number of seq. uninterrupted times
u=programmed signal strength threshold of adj. forward control channel
v=programmed timed duration of event message The flow chart begins with the step of enabling the operational mode during set-up or initialization. As such, the input device 20 is connected to the transceiver module 22 through the handset connector 26 allowing messages regarding the status of the input device 20 to be received by the transceiver module 22. In the following step 44, the number (a) of complete scans of the total frequency spectrum of forward control channels are counted, while in step 46, the number (b) of forward control channels scanned are counted.

The next step 48 retrieves and stores particular characteristics regarding each scanned forward control channel in a memory table or data array. Preferably, the characteristics include the forward control channel number (c) and the signal strength (d) of the forward control channel (in dBm), commonly known as RSSI. After this step, the number (b) of forward control channels is incremented in step 50 and compared to the total number (x) of licensed forward control channels in step 52. As mentioned above, there are currently twenty-one (21) forward control channels in the licensed frequency spectrum and therefore the programmed number would preferably be twenty-two (22). If the number (b) of forward control channels does not satisfy the total number of licensed forward control channels, then a complete scan has not been fulfilled and the loop 54 is repeated and the memory table or data array updated. Once the number (b) of forward control channels exceeds the total number of licensed forward control channels, the logical flow moves from loop 54 to step 56 which provides for retrieving and storing the number (e) of sequential uninterrupted times each forward control channel remained below a certain pre-programmed threshold in a memory table or data array. Preferably, this threshold is within the range of −115 dBm and −125 dBm. The number (a) of complete scans of the total spectrum of forward control channels is incremented in step 58 and compared with the total number (y) of complete scans programmed in step 60. If the number (a) of complete scans of the total spectrum of forward control channels does not equal the total number (y) of programmed scans, then the complete scan has not been fulfilled and the loop 62 is repeated and the memory table or data array updated. Once the number (a) of complete scans exceeds the programmed number of complete scans (y), the logical flow does not implement loop 62.

The total number (y) of complete scans programmed can be any number of scans which provides reasonable assurance of the availability or inactivity of a particular forward control channel yet does not exceed a desired time limit. In the preferred embodiment, the total number (y) is 100. This number was based on factoring the time required to complete the total scanning process of both loops 54 and 62. In the preferred embodiment, the upper limit of time required to complete this process was approximately three minutes.

Once the logic flow proceeds beyond both scanning loops 54, 62, the program is ready to make a selection of forward control channels based on the information stored in the memory tables or data array. In step 64, the number (e) of sequential uninterrupted transmissions that each forward control channel's signal strength remained below a programmed threshold (f) is compared to pre-programmed number (z). The threshold (f) is preferably with the range of −115 dBm to −125 dBm. In the preferred embodiment, it is desirable to select only those forward control channels having a signal strength (d) below the threshold (f) during all complete scans of loop 62. Therefore, the variable (z) is preferably programmed to the value of 101.

However, if there are no forward control channels which meet this criteria, step 66 determines an alternate forward control channel having the next highest number (e) of sequentially uninterrupted transmissions below the threshold (f) and this forward control channel is selected in step 68. However, it may be that multiple forward control channels meet this criteria. If such is the case, a determination as to what forward control channel is best suitable for the transmission is determined in steps 70–78.

More specifically, step 72 eliminates forward control channel candidates by comparing the signal strength (d) of forward control channels which are adjacent in frequency to a particular candidate. If the signal strength (d) of the adjacent forward control channel is greater than a programmed threshold (u), then that particular forward control channel candidate which is adjacent to the forward control channel having a signal stength greater than the threshold (u) is dropped as a candidate. In the preferred embodiment, the threshold (u) is preferably within the range of −75 dBm to −85 dBm. If there still remains more than one selected forward control channel, step 78 provides for a random selection. If the above process eliminates all forward control channel candidates, step 76 provides for a reselection based on the forward control channel having the lowest signal strength (d). Once one forward control channel is selected based on its particular characteristics, its respective or corresponding reverse control channel is determined in step 80.

The logic routine proceeds to read the code or message from the input device 20 in step 82. In step 84, a data packet consistent with the EIA/TIA-553 for standard reverse control channel messages used in a cellular telecommunications network 13 is assembled prior to transmission of the data packet to message processor 16. The only four meaningful entries in the data packet are MIN1, MIN2, number (e) of sequentially uninterrupted transmissions below the threshold, and the supervision or event code or message as defined above. It is to be noted that the software program associated with the transceiver device 22 automatically inserts the supervision or event code into the data packet. Standard to any reverse control channel message is the MIN1 and MIN2 codes which provide identification information regarding the premise 14.

A determination of the message content is made in step 86. If the message is an event code or message, the transceiver module 22 enters event mode in step 88. As shown in step 90, the data packet is sent instantaneously to the message processor 16 over the selected reverse control channel (c1). The transmission is continuous for a programmed timed duration (v). After the timed duration expires, the event mode is disabled and the wait mode entered as shown in step 90. During the wait mode, the transducers are enabled putting the phone back on-hook and in normal voice mode. In wait mode, the dispatcher might dial the premise. The speaker-mike combination shall be automatically active as soon as the connection is made. Also, when the dispatcher dials the premise, a silent ring and an electronic off-hook action may take place, and he or she can verify the alarm event. Resetting the alarm control panel exits wait mode and restores phone to supervision mode and disables the speaker-mike combination.

If the message is not an event message it is assumed it is a supervision message. Accordingly, the routine proceeds to step 94 where the supervision mode is enabled. The data packet is sent repetitively in step 96. In the preferred embodiment, transmission of the reverse control channel last approximately 52.8 ms. After the transmission, the entire logical flow program beginning with step 42 is repeated as shown in step 98. This results in a repeated supervisory transmission approximately every three minutes.

Referring again to FIG. 1, each message processor 16 in the network 10 is preferably placed near or at each respective cellular site 30a–n in cellular telecommunications network 13. The purpose for such placement is to ensure that the message processor 16 is located near the source of forward control channel transmissions so that the reverse control channel selected will, in all likelihood, not match the cell site's reverse control channel receiver, but rather will be received by the message processor 16. Additionally, it also provides a less expensive means in determining the most appropriate antenna site.

The message processor 16 is a self-contained enclosure containing electronic modules tied together in order to receive the data packets sent from the transceiver module 22 over antenna 105 and decode the contents of the messages embodied in the data packets for further transmission to the metro processor 100. The message processor 16 has the ability to receive data packets sent from a variety of premises 14n located in its user area. Additionally, the message processors 16 may be designed and positioned so that for any geographical user area, there are at least two message processors 16 which can receive data packets from transceiver modules 22 in that particular area. This provides redundancy in cases where there is an equipment failure or other cause which would render a message processor 16 unusable.

Figure 4:
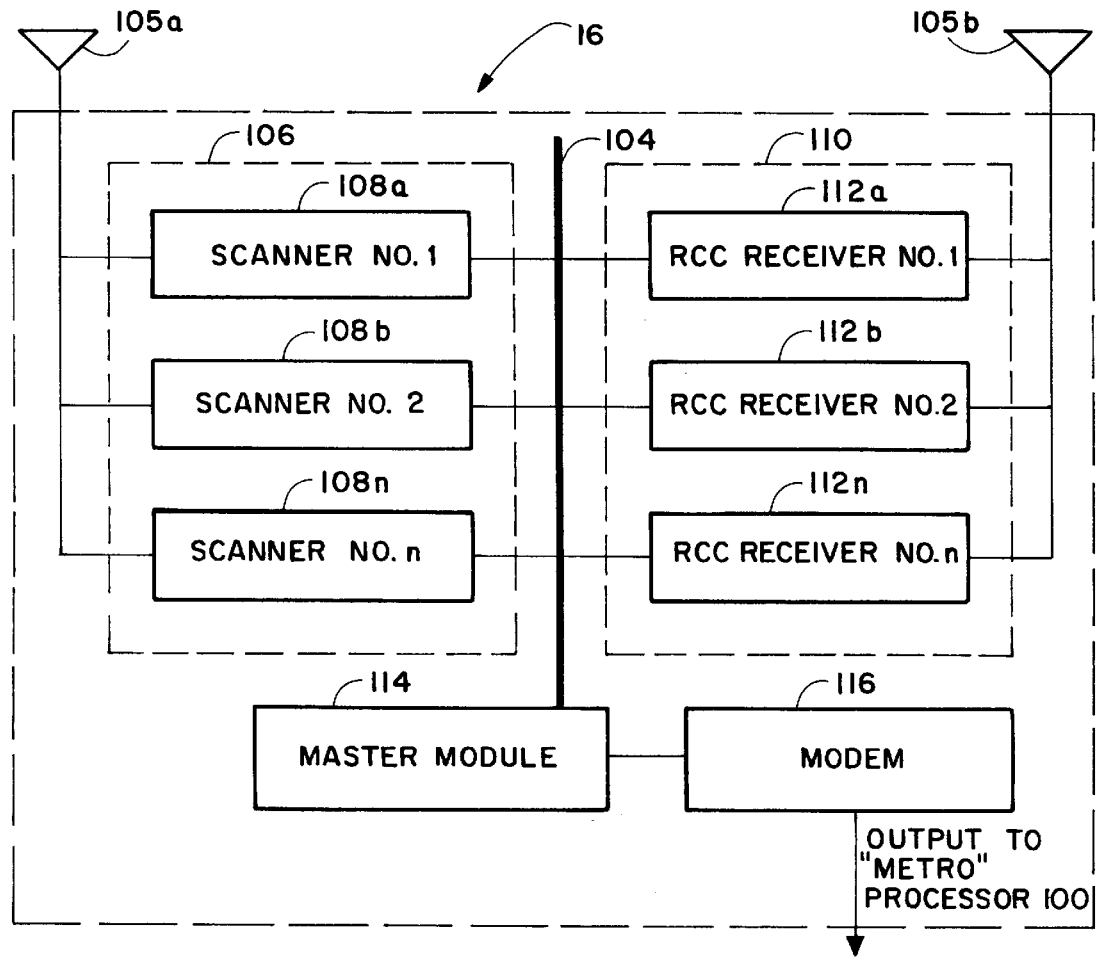
FIG. 4 is a block diagram showing the elements of the message processor.

The electronic equipment which comprises the message processor 16 is best illustrated by reviewing FIG. 4. Aside from its strategic location within the cellular telecommunications network 13, the message processor 16 has three main components which communicate with each other over a digital bus 104. The digital bus 104 may be any well known bus such as I²C. The first main component is a scanner module 106. The scanner module 106 may contain one or more reverse control channel scanners 108 *a,b,n* for scanning all devices transmitting over any licensed reverse control channel. The devices not only intercept transceiver module 22 transmissions in the user area, but all active cellular phones and ordinary phones transmitting in the defined user area of the message processor 16. In the preferred embodiment, three reverse control channel scanners 108*a,b,n* are provided, each scanner scanning seven (7) of the twenty-one (21) licensed reverse control channels for detecting an elevated signal level of any reverse control channel. Preferably, each complete scan of seven (7) reverse control channels takes approximately 14 ms.

The second main component is a receiver module 110 which may contain one or more reverse control channel receivers 112*a,b,n* for decoding the specific reverse control channel message scanned. Preferably, three reverse control channel receivers 112*a,b,n* are provided which are operating in either a busy or non-busy mode at any one point in time. In operation, when an active reverse control channel is detected, the reverse control scanner creates an interrupt grabbing the digital bus 104 and alerting any non-busy reverse control channel receiver 112*a,b,n* to start monitoring the specific reverse control channel message. Three reverse control channel receivers can handle up to three reverse control messages simultaneously without losing the ability to decode these messages and transmit their content to the central facility. Statistically, the probability for more than three simultaneous calls is insignificant when expected number of premises 14 around each cell site is approximately 1000. It must be noted that more or less reverse control channel receivers may be used depending on the particular application and the number of subscribers expected within a particular area.

The third main component is a master module 114. The master module 114 interacts continuously with the reverse control channel receivers 112*a,b,n* through the digital bus 104. More specifically, the master module 114 controls the availability of the digital bus 104 for use by each reverse control channel receivers 112*a,b, n* as well as for itself. Typically, each reverse control channel receiver 112 sequentially uses the digital bus 104 to write to a memory table in the master module 114. When the respective reverse control channel receiver has access to the digital bus, it downloads its reverse control channel message essentials to the memory table in the master module 114. When the master module 114 itself has access to the digital bus 104, it conducts internal diagnostics to make sure the message processor 16 is intact and viable.

The master module 114 monitors the memory table or data array content, assembles a data packet, and transmits the data packet to the metro processor or central facility. The assembled data packet may be made of hundreds of records, each record containing the above described information (i.e. MIN1, MIN2, number (e) of sequentially uninterrupted transmissions below the threshold, and the supervision or event code or message, in addition to a three digit message processor identifier and a trailer comprised of a check sum digits for error detection purposes. Consequently, the data packet sent from any given message processor 16 will vary in size depending on the number of messages it has received.

It must be remembered that concurrent to the activities of the master module 114, the reverse control scanners 108*a, b,n,* which are scanning for activity on any reverse control channel, may interrupt any activity in order to grab a hold on the digital bus for the purposes of notifying a non-busy reverse control channel receiver to start the interception of a particular reverse control channel number. Any interrupt activity, by any of the modules, affecting the availability of the digital bus 104, will preempt the other modules if they were to access the bus at the same time.

In addition to the three main components of the message processor 16, FIG. 4 illustrates a modem 116 operable with the master module 114 for transmitting the data packets to the metro processor 100. It is to be understood that any device for transmitting data may replace the modem in the present invention.

Referring again to FIG. 1, the metro processor 100 receives data packets of variable sizes from multiple message processors 16 in its user area. A typical metro area will incorporate approximately one hundred message processors the transmission duration for each record would be approximately three (3) ms per record.

The metro processor 100 is a computer which monitors supervision and event messages and filters out all non-exceptional events for further transmission to a central station 118. The central station 118 is preferably a local area network which receives information from multiple metro processors 100 nationwide. An example of non-exceptional events would include all non-subscriber transmissions such as cellular phones in the area using a reverse control channel and ordinary supervision signals. An example of two exceptional events would be non-transmission of periodic supervision messages or the transmission of an event message.

The metro processor 100 also assembles and routes a data packet of exception events to be transmitted to the central station 118 local area network. The data packet transmitted to the central station 118 includes a header record which identifies the metro processor 100, data records each having a message processor header including MIN1, MIN2, number (e) of sequentially uninterrupted transmission below the threshold, and the event code or message. A modem line 120 is used to transmit the above information to the central station 118.

Figure 5:
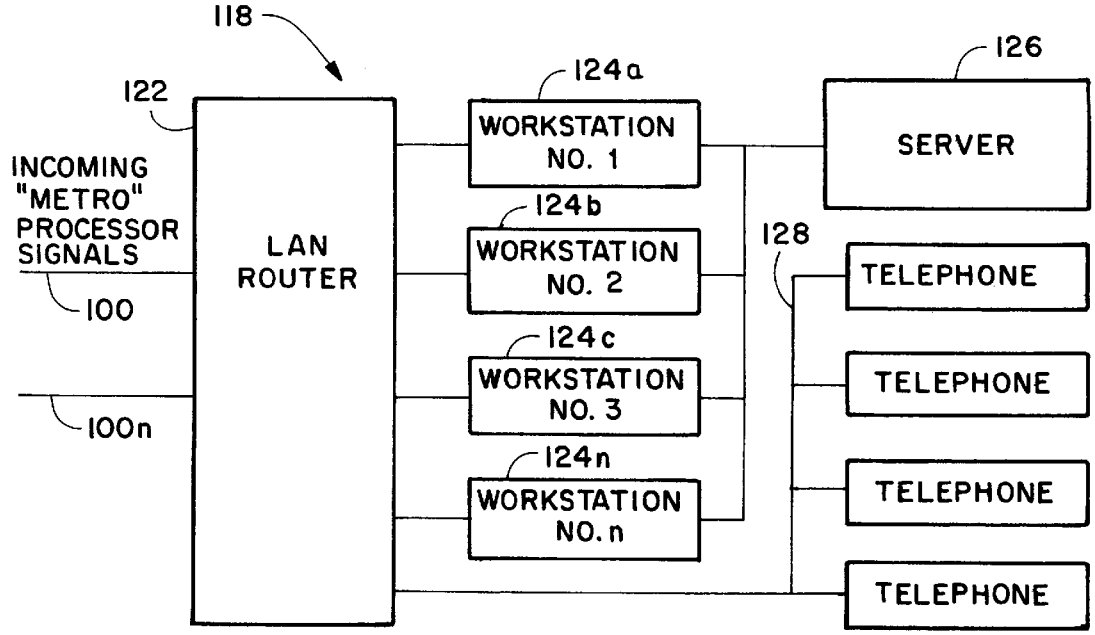
FIG. 5 is a diagram overview of the central station local area network.

Now referring to FIG. 5, the central station 118 is a local area network 122 made up of multiple dispatcher workstations 124a–n and a server computer 126. The local area network 122 connects with all metro processors 100a–m and provides linkage between all received data packets and the dispatcher workstations 124a–n. Each worksation is preferably a microprocessor computer such as a pentium-based computer and is connected through a modem to the central station PBX system 128. The PBX system 128 ensures that if a workstation 124 is busy handling a call, the next non-busy workstation 124 is connected to the local calling metro processor 100a–n. When an exceptional message is received by a respective workstation 124, a display of the problem occurs. The server computer 126 in the local area network 122 maintains the complete subscribers database and is connected to each workstation for providing premise particles such as the transceiver module 22 number. For example, when the transceiver module 22 is in wait mode, the dispatcher might dial the premise transceiver module 22 to verify the event. The PBX system 128 allow the dispatcher to make a call to either or both the affected transceiver module 22 or police, fire department, or other third party.

It will therefore be understood that various changes in the details, materials and arrangement of parts which have been herein described and illustrated in order to explain the nature of the invention may be made by those skilled in the art within the principal and scope of the invention as expressed in the following claims.

I claim:

1. A communications network which utilizes cellular telecommunications network technology for reporting information from a premises to a central monitoring facility, comprising:

an input device associated with said premises for providing one or more messages;

a cellular transceiver module operable with said input device for receiving said one or more messages from said input device and transmitting said one or more messages on a preselected reverse control channel;

a message processor placed at a predetermined site for receiving and decoding said one or more messages transmitted from said cellular transceiver module, and transmitting said one or more messages to said central monitoring facility; and wherein said preselected reverse control channel has a corresponding forward control channel, said corresponding forward control channel having a signal strength below a predetermined threshold.

2. A network as recited in claim 1 wherein said predetermined threshold is within the range of −115 to −125 dBm.

3. A communications network which utilizes cellular telecommunications network technology for reporting information from a premises to a central monitoring facility, comprising:

an input device associated with said premises for providing one or more messages;

a cellular transceiver module operable with said input device for receiving said one or more messages from said input device and transmitting said one or more messages on a preselected reverse control channel;

a message processor placed at a predetermined site for receiving and decoding said one or more messages transmitted from said cellular transceiver module, and transmitting said one or more messages to said central monitoring facility; and wherein said preselected reverse control channel has a corresponding forward control channel, and wherein said corresponding forward control channel is adjacent in frequency to one or more adjacent forward control channels, said one or more adjacent forward control channels having a signal strength below a predetermined threshold.

4. A network as recited in claim 3 wherein said predetermined threshold is within the range of −75 to −85 dBm.

5. A method of communicating information from a premises to a central facility using cellular telecommunications frequencies, comprising the steps of:

interfacing a transceiver module associated with said premises with an input device;

scanning a plurality of forward control channels using said transceiver module and measuring a set of preselected characteristics associated with said forward control channels;

selecting a usable forward control channel based on a comparison of said preselected characteristics associated with said forward control channel to a predetermined criteria, wherein said step of selecting said forward control channel includes the step of initially selecting one or more forward control channels from said plurality of forward control channels, said initially selected one or more forward control channels having a signal strength remaining below a preselected threshold, and the step of eliminating said initially selected forward control channels if adjacent in frequency to a forward control channel having a signal strength of a preselected value or higher, and the step of randomly selecting one of said one or more remaining said plurality of forward control channels;

transmitting a message to a message processor for decoding the content of said message; and determining a reverse control channel corresponding to said selected forward control channel for transmission of said message to said central facility.

* * * * *